Figure 1:
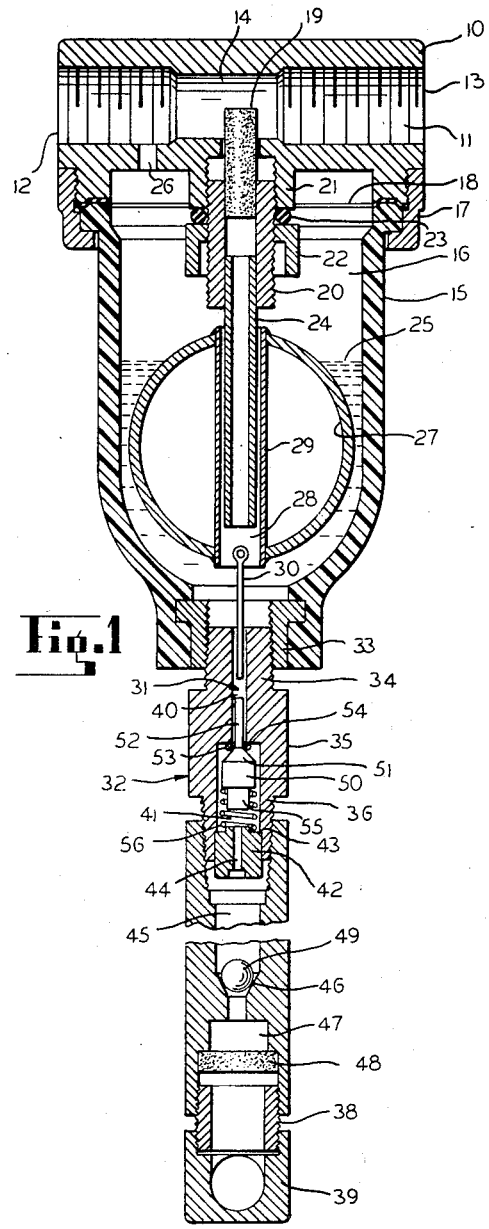

March 15, 1960 — E. W. VERES — 2,928,663

AUTOMATIC FILLING SYSTEM

Filed April 28, 1958

INVENTOR.
EDWARD W. VERES
BY John W. Graham
ATTORNEY

United States Patent Office 2,928,663
Patented Mar. 15, 1960

2,928,663
AUTOMATIC FILLING SYSTEM

Edward W. Veres, Arlington Heights, Ill., assignor to Arrow Tools, Inc., Chicago, Ill., a corporation of Illinois Application April 28, 1958, Serial No. 731,279

8 Claims. (Cl. 261—70)

This invention relates to a filling system, and more particularly to an automatically operable system for supplying liquid to a reservoir to maintain the liquid level therein relatively constant. The invention has utility, for example, in airline lubricators.

In my copending application, Serial No. 472,823, filed December 3, 1954 (now Patent No. 2,873,818), of which this is a continuation-in-part, there is disclosed an automatic filling system, and such disclosure is made with reference to the exemplary environment of an airline lubricator. In general, airline lubricators comprise a reservoir adapted to contain a liquid lubricant, a passage through which air flows from the compressor to the utilization device, and a means for feeding lubricant into the air passage from the reservoir. The specific lubricator there considered is one in which the flow passage communicates with the reservoir and thereby establishes a superatmosphere pressure within the reservoir. This pressure is utilized to feed liquid into the air passage.

The filling system comprises a float in the reservoir which is connected with and controls a valve located in a coupling that connects with a lubricant supply line. The pressure of the lubricant fluid in the supply line urges the valve toward its closed position; but when the liquid in the reservoir recedes below a predetermined value, the float descends to open the valve and permit the admission of lubricant into the reservoir. This automatic filling system has operated quite successfully in most environments, but it has been discovered that in some cases an unusual condition is presented by the manner in which the utilization device to which lubricant is supplied uses or consumes the air supplied to it by the compressor. Such condition is one in which the utilization device is operated intermittently at a relatively high frequency, and each time it is placed in operation demands such a large charge of air that the pressure in the airline (and consequently in the reservoir of the lubricator) drops sharply. This condition may be aggravated where a plurality of utilization devices each equipped with a lubricator are furnished with air from a common supply line.

The result noted in such situations is that the liquid lubricant in the reservoir is not maintained at a relatively constant value but rather, over a period of time, the level rises. Thus, when the reservoir is so overfilled, too much lubricant is fed to the airline, and the resulting over lubrication of the utilization device is an undesirable condition. I have analyzed the cause of such overfilling under the conditions set forth, and have discovered a means for avoiding such consequence; and the provision thereof is one of the objects of this invention.

Another object of the invention is in the provision of an improved automatic filling system for supplying a liquid under pressure to a reservoir to maintain the level therein relatively constant. Still another object is in the provision of an automatic filling system for supplying liquid to a reservoir that contains in addition to the liquid a gas under pressure and that is especially suited to environments in which the pressure of the gas varies sharply at a relatively rapid rate.

A further object is in the provision of an automatic filling system of the character described, which employs a valve for controlling the supply of liquid to the reservoir, and in which the valve is a substantially weightless body, relatively free of inertia in this environment. Additional objects and advantages of the invention will become apparent as the specification develops.

An embodiment of the invention is illustrated in the accompanying drawings, in which—

Figure 4:
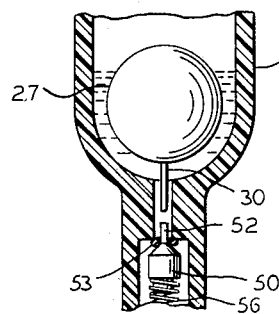
Figure 5:
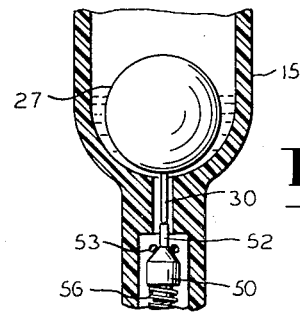
Figure 6:
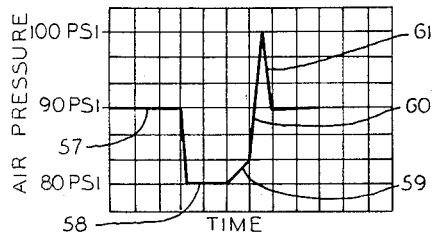

Figure 1 is a vertical sectional view of an airline lubricator having an automatic filling system embodying the invention; Figures 2 through 5, inclusive, are broken vertical sectional views, largely diagrammatic in character to show various functional conditions of the filling system; and Figure 6 is a graph illustrating the pressure change of the gas within the reservoir in relation to the time cycle of operation of a utilization device connected with the lubricator.

The airline lubricator illustrated in Figure 1 and its operating characteristics are described briefly in my copending patent application identified hereinbefore, and even more particularly in Johnson patent, No. Re. 24,232. For convenience, it may be stated that the lubricator comprises a housing 10 having a passage 11 therein through which air under pressure flows from the inlet 12 to the outlet 13 in being fed from a compressor to a utilization device. The passage is restricted intermediate the ends thereof as shown at 14 to provide a venturi effect. Depending from the housing is a bowl 15 defining a reservoir 16 therein, and the bowl is sealingly secured to the housing by means of a threaded connector ring 17. Preferably, a gasket 18 is interposed between the bowl and housing to effect such seal. A sintered rod 19 extends into the restricted portion 14 of the passage, and is carried by a sleeve 20 threaded into a boss 21 provided therefor by the housing. The sleeve is held in position by a ring nut 22 that bears against the boss through an O-ring seal 23. A hollow tube 24, pressed into or otherwise sealingly gripped by the sleeve 20, extends downwardly therefrom and into the liquid 25 contained within the reservoir.

In use of the lubricator, air under pressure flows through the passage 14; and since such passage is in open communication with the reservoir 16 through an aperture 26 on the high pressure side of the restriction 14, such air pressure is also present within the reservoir. The pressure—which, by way of illustration, may be about 90 pounds per square inch in usual applications—presses downwardly on the liquid 25 forcing the same upwardly through the hollow tube 24 and into the low pressure area 14 of the passage through the sintered rod or plug 19. The air sweeping over the plug picks up the liquid in a relatively fine state, and carries the same to the utilization device. Lubricant is fed into the passage only when there is an air flow therethrough, for only then is there a pressure differential between the reservoir and passage section 14 which is quite necessary to cause such feed.

Mounted within the reservoir 16 is a float 27 that in the specific illustration is generally spherical, but may have any other convenient or desired shape. Centrally, the float 27 is provided with a vertically extending passage or bore 28 therethrough defined by a tube 29 welded or braised or otherwise sealingly secured to the walls of the float so as to maintain the interior thereof in a liquid-tight condition. The tube 29 is circumjacent the tube 24, and is freely movable along the longitudinal axis thereof. At its lower end, the float (and more particularly the tube 29 thereof) is equipped with a pin or link 30 that extends downwardly therefrom and into a conduit provided by a coupling or connector member. For identification, the conduit is designated generally with the numeral 31 and the coupling with the numeral 32.

The coupling comprises a metal collar 33 molded integrally with the plastic bowl 15 and having integral threads engaging the threaded end 34 of the upper intermediate portion 35 of the coupling, which has a lower threaded end 36 of reduced cross section that engages the lower coupling section 37. The section 37 is connected by a nipple 38 to a supply conduit 39 through which lubricant under pressure is fed. The conduit or passage 31 through which liquid flows to the reservoir 16 has an upper end portion 40 of reduced cross section, defining a guide for the link 30, which is coincident with or forms an axial extension of the longitudinal axis of the tube 24.

Below the restricted guide section 40 of the conduit is an enlarged valve chamber 41 in communication therewith, which is partially closed at its lower end by a plug 42 that seats against a shoulder 43 when pressed into the end portion 36 of the coupling portion 35. The plug provides a conduit continuation 44 that opens into a relatively large check valve chamber 45 formed in the lower coupling portion 37. The check valve chamber 45 has a valve seat 46 formed therein, and communicates through this seat with an inlet chamber 47 that connects with the nipple 38 and consequently with the supply line 39. Preferably, a filter element 48 such as a sintered metal plug is positioned at the inlet chamber 47 to remove any dirt or scale particles picked up by the lubricant from the supply line 39 in the event that this line is not adequately flushed before use.

Mounted within the chamber 45 is a check valve 49 of spherical configuration adapted to sealingly engage the seat 46, and it functions to prevent the flow of fluid downwardly through the chamber 45 from the reservoir to the supply line 39. Mounted within the valve chamber 41 is a control valve 50 having a frusto-conical upper end 51, terminating in an extended guide rod 52 projecting into the guide section 40 of the conduit. The rod 52 is freely movable longitudinally within the passage section 40. An O-ring seal 53 is slipped over the rod 52 and rests on the frusto-conical portion 51 of the valve, and is adapted to engage a valve seat 54 defined at the upper end of the valve chamber 41. The valve has a lower end portion 55 of reduced cross section that telescopes into the upper end of a helical spring 56, that seats at its lower end against the plug 42 and is held in position by a slight boss formed in the upper surface thereof. The spring 56 urges the valve 50 toward the valve seat 54.

The general operation of the structure is as follows: When the liquid level within the reservoir is as shown in Figure 1, the float 27 and the link 31 attached thereto are so elevated that the link does not engage the rod or stem 52 of the control valve, and therefore the valve is biased into sealing engagement with the seat 54 by the pressure of the liquid acting upwardly thereon and the force of the spring 56. As liquid is withdrawn from the reservoir in accordance with the demand imposed thereon by the flow of air through the passage 11, the float 27 moves downwardly as the liquid level recedes. Such downward movement continues until the link 30 engages the valve stem 52 and thereafter displaces the valve from the seat, as shown in Figure 5. At such time, liquid is fed into the reservoir until the control valve 54 is closed as a result of the float 27 being lifted to a higher elevation within the reservoir. It will be appreciated that in a filling system of this type, the pressure of the lubricant must exceed the air pressure or the control valve will not be closed thereby; and the weight of the float must be greater than the pressure differential so as to overcome the same and open the valve when the reservoir requires filling. The pressure differential is necessarily small because of the smallness of the structures and limited float weight available.

Under the usual operating conditions, the pressure in the passage 11 remains relatively constant, as does the pressure within the reservoir 16. There may be a slight drop in the pressure when air is drawn through a passage upon demand of the utilization device, but any such pressure fluctuations are of no significance, and the lubricator and automotic filling system continue to operate satisfactorily. In certain environments, as mentioned hereinbefore, the demand imposed on the compressor by the utilization device cannot be instantaneously satisfied, and as a consequence the pressure in the passage 11 drops sharply—as then does the pressure in the reservoir 16. Thereafter, the pressure commences to return to normal; but if the operation of the utilization device is intermittent, the demand for air terminates before the pressure assumes its normal value.

It is believed that in such cases, the pressure within the reservoir 16 tends to assume a value in excess of the normal line pressure because of a packing effect. That is, air is flowing at a relatively high velocity through the passage 11 when the requirement therefor is instantaneously terminated. However, the inertia of the air mass maintains it in motion and thereby forces a flow of air through the aperture 26 and into the reservoir 16, with the result that the excessive mass of air then within the reservoir, necessarily increases the pressure therein. Ultimately, the pressure must and does return to normal.

An operational sequence of this type is depicted in Figure 6 in accordance with the functional characteristics described. The curve is seen to have a relatively flat portion 57 which is the normal line pressure, assumed to be 90 p.s.i., when the high demand utilization device is inoperative. As soon as the device is placed in operation, the large air demand created thereby causes the pressure in the reservoir and in the passage 11 to drop sharply to some value below the normal line pressure, and this low value continues for a short time as shown by the portion 58 on the graph. If the utilization device continues to operate for a short interval, the pressure starts to return to normal as evidenced by the upwardly sloped portion 59.

If such device is operated intermittently for short periods, its operation will terminate abruptly before the pressure returns to normal whereupon the described packing effect causes the pressure within the reservoir to rise sharply along the curve 60 to a value in excess of the normal 90 p.s.i. The pressure does, of course, return to normal along the slope 61, assuming the device is not again placed in operation prior to that time. With a high demand utilization device operated intermittently at a relatively rapid rate, the pattern shown in Figure 6 is repeated. In observations that have been made, the pressure in the reservoir has been seen to vary between 80–100 p.s.i. with a normal line pressure of 90 p.s.i.

Under the unsuual operation conditions described, the level of the lubricant 25 within the reservoir gradually rises; and in certain instances, the rate of rise is sufficiently rapid so as to be visually observed. In other instances, the rate of rise is imperceptible from moment to moment, but is quite evident over a period of several hours. In either case, the overfilling of the reservoir leads to over-lubrication of the utilization device. I believe that a theoretical explanation for the overfilling problem is as follows: When the reservoir is filled to the required level and the utilization device is inoperative, the components of the lubricator and filling system have the interrelation shown in Figure 1, corresponding to the flat portion 57 of the graph. Upon actuation of the utilization device, the pressure drops within the reservoir, but the control valve 50 is still held in engagement with the seat therefor by the force of the spring 56 and pressure of the lubricant in the coupling and supply line which is now much greater than the air pressure and acts upwardly against the valve. The components at such time have the configuration illustrated in Figure 2 which corresponds to the portion 58 on the graph. Since the valve is closed, no lubricant will be fed to the reservoir, and the only change that can occur therein is that the float 27 may rise slightly because of the decreased pressure acting downwardly thereagainst.

Sudden termination of the operation of the utilization device creates an increased pressure in the reservoir 16 as heretofore described; and as a consequence thereof a shock wave is fed through the lubricant that reacts against the valve 50 to displace it from the seat 54, and if the increase in pressure exceeds the normal pressure differential favoring the lubricant, the valve will be propelled further from its seat. However, the valve 50 is designed and constructed to be a substantially weightless body within the environment of the liquid lubricant, and therefore is returned to sealing engagement with the seat 54 almost immediately or at least within a time period so short that substantially no lubricant enters the reservoir.

Figure 3:
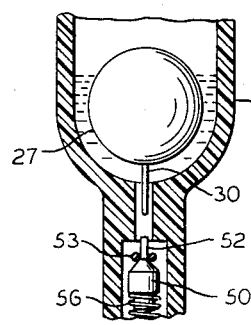

In the absence of such a weightless condition lubricant seeps into the reservoir because as soon as the shock wave terminates, and/or the pressure in the reservoir decreases to a value whereat the pressure of the lubricant is again superior, the check valve 49 is raised from its seat almost instantaneously since it is at rest and, therefore, its inertia is low. The inertia of the control valve 50, however, would be high for at this same time it has a downward velocity that first must be overcome before it can be accelerated toward its seat. The time lag thus established would result in the infeed of lubricant to the reservoir. The shock wave displacement of the valve is shown in Figure 3, and corresponds to the line 60 of the graph; while the valve after its return is shown in Figure 4 and corresponds to the line 61 of the graph.

Figure 2:
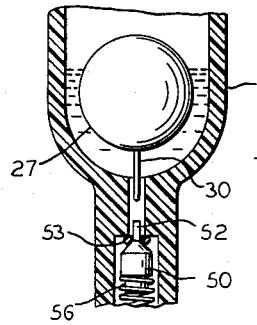

It is believed that the shock wave action that occurs in the liquid body is quite similar to the water hammer effect frequently experienced in water lines when the outlet valves are turned on and off quickly, and repetitively at a relatively high frequency. It is to be noted that the mass of liquid does not shift because of the check valve 49 which prevents the escape of liquid therepast from the reservoir. Therefore, the level of the liquid in Figures 2 through 4 is substantially constant. However, the float 27 may be moved downwardly at the same time that the valve 50 is displaced from its seat, and this condition is also illustrated in Figure 3. It should be noted that the float will not return to its normal position with the same speed as the valve 50 because the float is a relatively large body having substantial inertia, and thus a considerable time is required to terminate its downward movement and return the same. Therefore, in Figure 4, the float 27 is downwardly displaced even though the valve 50 has been returned to engagement with the seat 54.

Since the valve 50 is substantially weightless, there is almost no inertia to overcome in reversing its path of movement so that it is returned almost instantaneously to the seat 54. Further, such rapid return is not impeded by the mass of the float 27 since the weightless valve is isolated from the inertial effects thereof. Actually, in the mechanical configuration shown, the valve 50 has no coupling or mechanical connection with the float 27 except during a filling operation, as shown in Figure 5, which is caused by a drop in the level of the liquid. This disassociation from the float is advantageous in another respect in that turbulence of the liquid created both by the inrush of air when the reservoir is packed thereby and usual vibration, which necessarily cause the float to oscillate, do not cause vibration of the valve and leakage thereof.

Irrespective of any theoretical explanation of the cause and effects described, it is known that the structural composition set forth provides a solution to the problem, and in numerous tests has proved to be entirely satisfactory. In practical applications, it is difficult to achieve a true weightless condition for the valve 50, especially since the specific gravity of the liquids employed as the lubricant may vary, and necessarily the weightlessness of the valve is directly related thereto. To avoid this complication, the spring 56 is used in conjunction with the valve to apply a slight biasing force thereagainst. The spring force may be quite small as, for example, within a range of about ½ to 1 ounce for such force is sufficient to accommodate changes in specific gravity of the lubricant, manufacturing tolerances for the valve, etc. Also, an ancillary advantage realized is that the differential between the pressure of the air within the passage 13 and lubricant within the feed line 39 need not be as great as heretofore necessary, and the system functions satisfactorily with an excess of pressure in the lubricant feed line 39 of as little as about 3 p.s.i.

While in the foregoing specification an embodiment of the invention has been set forth in considerable detail for purposes of making an ample disclosure thereof, it will be apparent to those skilled in the art that numerous changes may be made in those details without departing from the principles and spirit of the invention.

I claim:

1. In a device having a flow passage adapted to be interposed in a supply line delivering gaseous fluid under pressure to a mechanism actuated thereby and having also a liquid-receiving reservoir communicating with said flow passage at one location therealong so that such gaseous fluid under pressure is normally present in said reservoir, such fluid-actuated mechanism sometimes being subject to intermittent and repetitive operations and having a relatively large fluid requirement whereby the fluid pressure in said reservoir rapidly fluctuates above and below the normal line pressure during the respective alternate periods of operation and inoperation, a coupling providing a flow conduit therethrough and being connected with said reservoir adjacent the lower end portion thereof for supplying liquid thereto from a pressurized source of such liquid, a valve seat provided by said coupling along said conduit, a relatively light weight valve characterized by having a substantially weightless condition considered in the supporting environment of such liquid and being disposed below said seat so as to be biased upwardly theretoward and into closing relation therewith by the supporting liquid supplied to said conduit from such pressurized source, a float of substantial weight relative to said valve and being positioned within said reservoir generally above said valve for connection therewith to displace the same from said seat when the liquid within said reservoir recedes below a predetermined level but otherwise being physically disassociated from said valve so that movement thereof toward and away from said seat can occur without interference from and without concurrent movement of said float, and guide structure for constraining said float for vertical movement to effect such displacement of said valve, the substantially weightless condition of said valve and normal isolation thereof from said float and the inertia thereof being effective to compensate for the shock wave action on said valve resulting from such pressure fluctuation in said reservoir and thereby prevent excess filling of said reservoir otherwise incident to such pressure fluctuations.

2. In a device having a flow passage adapted to be interposed in a supply line delivering gaseous fluid under pressure to a mechanism actuated thereby and having also a liquid-receiving reservoir communicating with said flow passage at one location therealong so that such gaseous fluid under pressure is normally present in said reservoir, such fluid-actuated mechanism sometimes being subject to intermittent and repetitive operations and having a relatively large fluid requirement whereby the fluid pressure in said reservoir rapidly fluctuates above and below the normal line pressure during the respective alternate periods of operation and inoperation, a coupling providing a flow conduit therethrough and being connected with said reservoir adjacent the lower end portion thereof for supplying liquid thereto from a pressurized source of such liquid, a valve seat provided by said coupling along said conduit, a relatively light weight valve characterized by having a substantially weightless condition considered in the supporting environment of such liquid and being disposed below said seat so as to be biased upwardly theretoward and into closing relation therewith by the supporting liquid supplied to said conduit from said pressurized source, a check valve characterized by having substantially greater weight than said valve and being operative within said coupling on the inlet side of said valve to prevent the flow of liquid through said conduit in a direction away from said reservoir, a float of substantial weight relative to said valve and being positioned within said reservoir generally above said valve for connection therewith to displace the same from said seat when the liquid within said reservoir recedes below a predetermined level but otherwise being physically disassociated from said valve so that movement thereof toward and away from said seat can occur without interference from and without concurrent movement of said float, and guide structure for constraining said float for vertical movement to effect such displacement of said valve, the substantially weightless condition of said valve and normal isolation thereof from said float and the inertia thereof being effective to compensate for the shock wave action on said valve resulting from such pressure fluctuation in said reservoir and thereby prevent excess filling of said reservoir otherwise incident to such pressure fluctuations.

3. In a device having a flow passage adapted to be interposed in a supply line delivering gaseous fluid under pressure to a mechanism actuated thereby and having also a liquid-receiving reservoir communicating with said flow passage at one location therealong so that such gaseous fluid under pressure is normally present in said reservoir, such fluid-actuated mechanism sometimes being subject to intermittent and repetitive operations and having a relatively large fluid requirement whereby the fluid pressure in said reservoir rapidly fluctuates above and below the normal line pressure during the respective alternate periods of operation and inoperation, a coupling providing a flow conduit therethrough and being connected with said reservoir adjacent the lower end portion thereof for supplying liquid thereto from a pressurized source of such liquid, a valve seat provided by said coupling along said conduit, a relatively light weight valve characterized by having a substantially weightless condition considered in the supporting environment of such liquid and being disposed below said seat so as to be biased upwardly theretoward and into closing relation therewith by the supporting liquid supplied to said conduit from such pressurized source, a spring having a relatively low-value force in engagement with said valve for continuously biasing the same toward said seat to compensate for any deviation of said valve from such weightless condition, a float of substantial weight relative to said valve and being positioned within said reservoir generally above said valve for connection therewith to displace the same from said seat when the liquid within said reservoir recedes below a predetermined level but otherwise being physically disassociated from said valve so that movement thereof toward and away from said seat can occur without interference from and without concurrent movement of said float, and guide structure for constraining said float for vertical movement to effect such displacement of said valve, the substantially weightless condition of said valve and normal isolation thereof from said float and the inertia thereof being effective to compensate for the shock wave action on said valve resulting from such pressure fluctuation in said reservoir and thereby prevent excess filling of said reservoir otherwise incident to such pressure fluctuations.

4. In a device having a flow passage adapted to be interposed in a supply line delivering gaseous fluid under pressure to a mechanism actuated thereby and having also a liquid-receiving reservoir communicating with said flow passage at one location therealong so that such gaseous fluid under pressure is normally present in said reservoir, such fluid-actuated mechanism sometimes being subject to intermittent and repetitive operations and having a relatively large fluid requirement whereby the fluid pressure in said reservoir rapidly fluctuates above and below the normal line pressure during the respective alternate periods of operation and inoperation, said flow passage having an area of reduced pressure downstream of said one location resulting from the increased velocity of such gaseous fluid thereat and feeder structure connecting said area of reduced pressure with said reservoir to supply such liquid to the gaseous fluid flowing through said passage, a coupling providing a flow conduit therethrough and being connected with said reservoir adjacent the lower end portion thereof for supplying liquid thereto from a pressurized source of such liquid, a valve seat provided by said coupling along said conduit, a relatively light weight valve characterized by having a substantially weightless condition considered in the supporting environment of such liquid and being disposed below said seat so as to be biased upwardly theretoward and into closing relation therewith by the supporting liquid supplied to said conduit from such pressurized source, a float of substantial weight relative to said valve and being positioned within said reservoir generally above said valve for connection therewith to displace the same from said seat when the liquid within said reservoir recedes below a predetermined level but otherwise being physically disassociated from said valve so that movement thereof toward and away from said seat can occur without interference from and without concurrent movement of said float, and guide structure for constraining said float for vertical movement to effect such displacement of said valve, the substantially weightless condition of said valve and normal isolation thereof from said float and the inertia thereof being effective to compensate for the shock wave action on said valve resulting from such pressure fluctuation in said reservoir and thereby prevent excess filling of said reservoir otherwise incident to such pressure fluctuations.

5. In a device having a flow passage adapted to be interposed in a supply line delivering gaseous fluid under pressure to a mechanism actuated thereby and having also a liquid-receiving reservoir communicating with said flow passage at one location therealong so that such gaseous fluid under pressure is normally present in said reservoir, such fluid-actuated mechanism sometimes being subject to intermittent and repetitive operations and having a relatively large fluid requirement whereby the fluid pressure in said reservoir rapidly fluctuates above and below the normal line pressure during the respective alternate periods of operation and inoperation, said flow passage having an area of reduced pressure downstream of said one location resulting from the increased velocity of such gaseous fluid thereat and feeder structure connecting said area of reduced pressure with said reservoir to supply such liquid to the gaseous fluid flowing through said passage, a coupling providing a flow conduit therethrough and being connected with said reservoir adjacent the lower end portion thereof for supplying liquid thereto from a pressurized source of such liquid, a valve seat provided by said coupling along said conduit, a relatively light weight valve characterized by having a substantially weightless condition considered in the supporting environment of such liquid and being disposed below said seat so as to be biased upwardly theretoward and into closing relation therewith by the supporting liquid supplied to said conduit from such pressurized source, a check valve characterized by having substantially greater weight than said valve and being operative within said coupling on the inlet side of said valve to prevent the flow of liquid through said conduit in a direction away from said reservoir, a spring having a relatively low-value force in engagement with said valve for continuously biasing the same toward said seat to compensate for any deviation of said valve from such weightless condition, a float of substantial weight relative to said valve and being positioned within said reservoir generally above said valve for connection therewith to displace the same from said seat when the liquid within said reservoir recedes below a predetermined level but otherwise being physically disassociated from said valve so that movement thereof toward and away from said seat can occur without interference from and without concurrent movement of said float, and guide structure for constraining said float for vertical movement to effect such displacement of said valve, the substantially weightless condition of said valve and normal isolation thereof from said float and the inertia thereof being effective to compensate for the shock wave action on said valve resulting from such pressure fluctuation in said reservoir and thereby prevent excess filling of said reservoir otherwise incident to such pressure fluctuations.

6. The device of claim 5 in which said feeder structure comprises a sintered rod extending at its upper end into said flow passage.

7. The device of claim 6 in which said guide structure comprises a hollow tube communicating with said sintered rod for feeding liquid thereto and which slidably extends through said float for guiding vertical movement thereof.

8. The device of claim 5 in which a pair of linkage elements respectively carried by said float and valve in axial alignment are abuttable with each other when said float is lowered to effect the aforesaid displacements of said valve, the linkage element carried by said valve being effective to guide movement thereof along the axis of vertical movement of said float.

References Cited in the file of this patent

UNITED STATES PATENTS

| 741,962 | Grouvelle et al. | Oct. 20, 1903 |
| 1,195,343 | En Earl | Aug. 22, 1916 |
| 2,169,462 | De Grace | Aug. 15, 1939 |
| 2,477,224 | Wright | July 26, 1949 |
| 2,784,733 | Martinez | Mar. 12, 1957 |
| 2,873,818 | Veres | Feb. 17, 1959 |
| 2,886,056 | Ratliff | May 12, 1959 |

FOREIGN PATENTS

| 18,369 | Great Britain | Mar. 17, 1911 |